United States Patent
Ali Shah et al.

(10) Patent No.: US 10,439,856 B1
(45) Date of Patent: Oct. 8, 2019

(54) METHOD, SYSTEMS, AND COMPUTER READABLE MEDIA FOR EFFICIENT GENERATION OF NARROWBAND INTERNET OF THINGS (IOT) UPLINK SIGNALS

(71) Applicant: Keysight Technologies, Inc., Santa Rosa, CA (US)

(72) Inventors: Syed Faisal Ali Shah, Cary, NC (US); Roger Alan Slyk, Raleigh, NC (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/033,136

(22) Filed: Jul. 11, 2018

(51) Int. Cl.
*H04L 27/26* (2006.01)
*H04B 1/00* (2006.01)

(52) U.S. Cl.
CPC ....... *H04L 27/2636* (2013.01); *H04B 1/0003* (2013.01); *H04L 27/2607* (2013.01)

(58) Field of Classification Search
CPC ............................... H04L 67/12; H04L 27/26
USPC ........................................................ 375/355
See application file for complete search history.

(56) References Cited

U.S. PATENT DOCUMENTS

2018/0062904 A1* 3/2018 Hwang ..................... H04L 1/08

OTHER PUBLICATIONS

3rd Generation Partnership Project; Technical Specification Group Radio Access Network; Evolved Universal Terrestrial Radio Access (E-UTRA); Physical Channels and Modulation (Release 13), 3GPP Organizational Partners, pp. 1-169 (Apr. 2018).

Hanta, "LTE: Der Mobilfunk der Zunkunft; SC-FDMA and LTE Uplink Physical Layer Design,"Seminar: Ausgewählte Kapitel der Nachrichtentechnik, WS 2009/2010, pp. 1-16 (Dec. 2, 2009).

Rumney, "3GPP LTE: Introducing Single-Carrier FDMA"Agilent Technologies, www.agilent.com/go/journal, pp. 1-10 (Jan. 1, 2008).

* cited by examiner

*Primary Examiner* — Kevin Kim

(57) ABSTRACT

A method for efficient generation of a narrowband IoT uplink signal includes generating an under-sampled sequence of samples of a narrowband IoT uplink signal, identifying symbol boundaries in the sequence of samples that do not correspond to sample times, for each symbol boundary that does not correspond to one of the sample times: extrapolating, from a signal phase value for a sample at a last sample time before the symbol boundary, a signal phase value for a sample at a first sample time after the symbol boundary; calculating and applying a phase jump to the sample at the first sample time after the symbol boundary to generate a new phase value for the sample at the first sample time after the symbol boundary, wherein the phase jump is applied from the phase value extrapolated from the last sample time before the symbol boundary; and using the new phase value for the first sample time after the symbol boundary to calculate amplitude of the sample at the first sample time after the symbol boundary. The method further includes outputting the under-sampled sequence of samples for further uplink signal processing.

20 Claims, 8 Drawing Sheets

US 10,439,856 B1

METHOD, SYSTEMS, AND COMPUTER READABLE MEDIA FOR EFFICIENT GENERATION OF NARROWBAND INTERNET OF THINGS (IOT) UPLINK SIGNALS

TECHNICAL FIELD

The subject matter described herein relates to generating uplink signals for real or emulated IoT devices. More particularly, the subject matter described herein relates to methods, systems, and computer readable media for efficient generation of narrowband Internet of things (IoT) uplink signals.

BACKGROUND

Narrowband IoT devices are devices, such as sensors, that are accessible over the Internet and communicate wirelessly with access points or other access devices, such as evolved node Bs (eNBs). Narrowband IoT devices typically operate on battery power. Accordingly, it is desirable for narrowband IoT devices to efficiently generate uplink signals (from the devices to the network) to conserve battery life.

Similarly, in the case of narrowband IoT device emulators, such devices typically emulate hundreds or even thousands of narrowband IoT devices to test the functionality of the network equipment that processes signals from the devices. Even though narrowband IoT device emulators may have external power sources, it is desirable for the narrowband IoT device emulators to efficiently generate uplink signals to reduce the size, complexity, and cost of narrowband IoT device emulation equipment.

One type of uplink signal generated by a narrowband IoT device or device emulator includes single carrier or single tone frequency division multiple access (SC-FDMA) symbols. Each symbol has a specified number of samples that must be transmitted in a symbol time. Generating the specified number of samples for each symbol during a symbol time and processing the resulting symbols to produce the resulting narrowband IoT signals can consume processing power, which can reduce battery life in a real narrowband IoT device. Similarly, processing cycles of an IoT device emulator can also be excessively consumed in generating fully sampled symbols for hundreds or even thousands of narrowband IoT devices.

Accordingly, in light of these difficulties, there exists a need for methods, systems, and computer readable media for efficient generation of narrowband Internet of things (IoT) uplink signals.

SUMMARY

A method for efficient generation of a narrowband Internet of things (IoT) uplink signal includes generates an under-sampled sequence of samples of a narrowband IoT uplink signal, identifying symbol boundaries in the sequence of samples that do not correspond to sample times, for each symbol boundary that does not correspond to one of the sample times: extrapolating, from a signal phase value for a sample at a last sample time before the symbol boundary, a signal phase value for a sample at a first sample time after the symbol boundary; calculating and applying a phase jump to the sample at the first sample time after the symbol boundary to generate a new phase value for the sample at the first sample time after the symbol boundary, wherein the phase jump is applied from the phase value extrapolated from the last sample time before the symbol boundary; and using the new phase value for the first sample time after the symbol boundary to calculate amplitude of the sample at the first sample time after the symbol boundary. The method further includes outputting the under-sampled sequence of samples for further uplink signal processing.

The subject matter described herein may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1A:
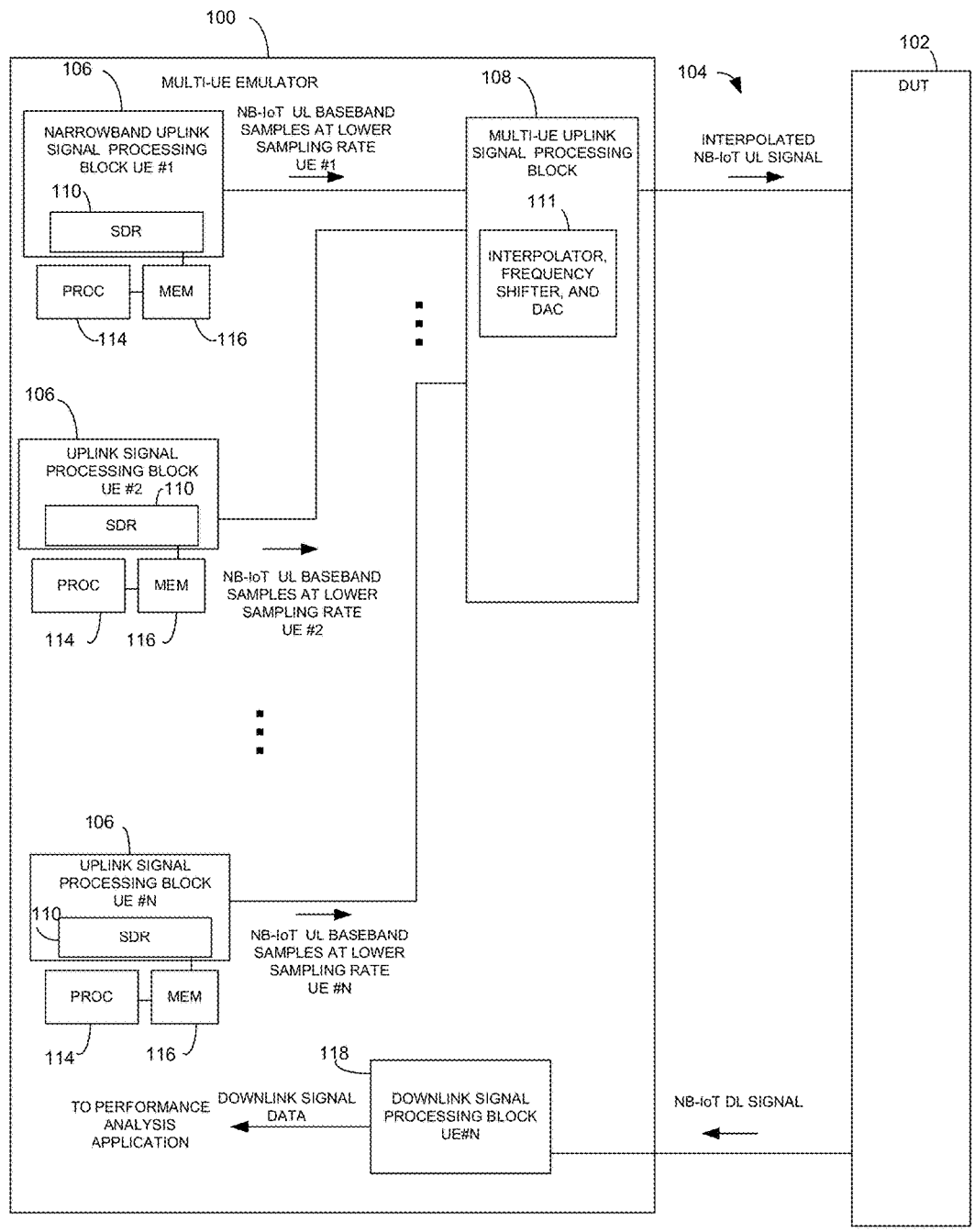
FIG. 1A is a block diagram of a system for efficient generation of narrowband IoT uplink signals.

Methods, systems, and computer readable media for efficient generation of narrowband IoT uplink signals are provided. In one exemplary implementation, the generation of narrowband IoT uplink signals is performed by a multi-UE emulator that simultaneously emulates multiple narrowband IoT devices communicating with a device under test, such as an eNB. FIG. 1A illustrates a multi-UE emulator that simultaneously and efficiently emulates multiple narrowband IoT devices. Referring to FIG. 1A, a multi-UE emulator 100 communicates with a device under test 102 via a real or simulated air interface 104. In the illustrated example, multi-UE emulator generates interpolated narrowband IoT uplink signals and transmits the signals to device under test 102. As used herein, the term "interpolated narrowband IoT signal" refers to the signal that is generated based on interpolating samples from an under-sampled narrowband IoT signal. Details of generation of the under-sampled narrowband IoT signal will be described below. Device under test 102 may be an eNB or other device that receives signals from narrowband IoT devices and transmits downlink signals to the narrowband IoT devices. Real or simulated air interface 104 may be an air interface or a cable or set of cables that is used to simulate over the air communications between multi-UE emulator 100 and device under test 102.

Multi-UE emulator 100 includes uplink signal processing blocks 106 and 108 for each UE being emulated. In one example, each uplink signal processing block 106 is implemented in software and comprises an SDR 110 that generates an under-sampled uplink signal. Uplink signal processing block 108 may be implemented in hardware or firmware, such as a field programmable gate array (FPGA), and may perform functions on the under-sampled uplink signal, such as interpolating the under-sampled uplink signal to generate the interpolated narrowband IoT uplink signal. Accordingly, each uplink signal processing block 108 includes an interpolator, frequency shifter, and digital-to-analog converter 111 that generate the interpolated signal, which includes a number of signal samples equal to the fully sampled number of samples required by an industry standard. The interpolated symbol samples may be generated through interpolation from the under-sampled signal values. The frequency shifter shifts the frequency of symbols that correspond to UEs transmitting at different frequencies. The DAC converts the frequency-shifted interpolated uplink signal samples into analog waveforms to be transmitted over interface 104.

As stated above, uplink signal processing block 106 may generate an under-sampled narrowband uplink signal. The under-sampled narrowband uplink signal may have fewer samples than required by relevant industry standards for each symbol being generated. For narrowband IoT devices, the number of samples per uplink symbol is defined in Third Generation Partnership Project (3GPP) Technical Standard TS 36.211, V13.9.0 (April 2018), the disclosure of which is incorporated herein by reference in its entirety. The number of uplink symbol samples required for different uplink symbol numbers is described below with respect to Table 1. Because fewer samples per symbol are generated, the number of cycles of processor 114 that are consumed in generating each narrowband uplink signal is reduced over those required to generate the fully sampled uplink signal. Similarly, utilization of memory 116 for uplink signal generation may also be reduced.

Multi-UE emulator 100 also includes downlink signal processing blocks 118 for each UE that process downlink signals from the DUT 102 and outputs the signals to a performance analysis application. Each downlink signal processing block 118 may decode downlink signals using the radio network temporary identifier (RNTI) specific to each UE being emulated. The downlink signal processing blocks 118 may extract downlink control information (DCI) for each UE and use the DCI to identify resource block allocations for each emulated UE. Once the resource block allocations for emulated UE are identified, the data in each resource block can be extracted and provided to a performance analysis application.

Figure 1B:
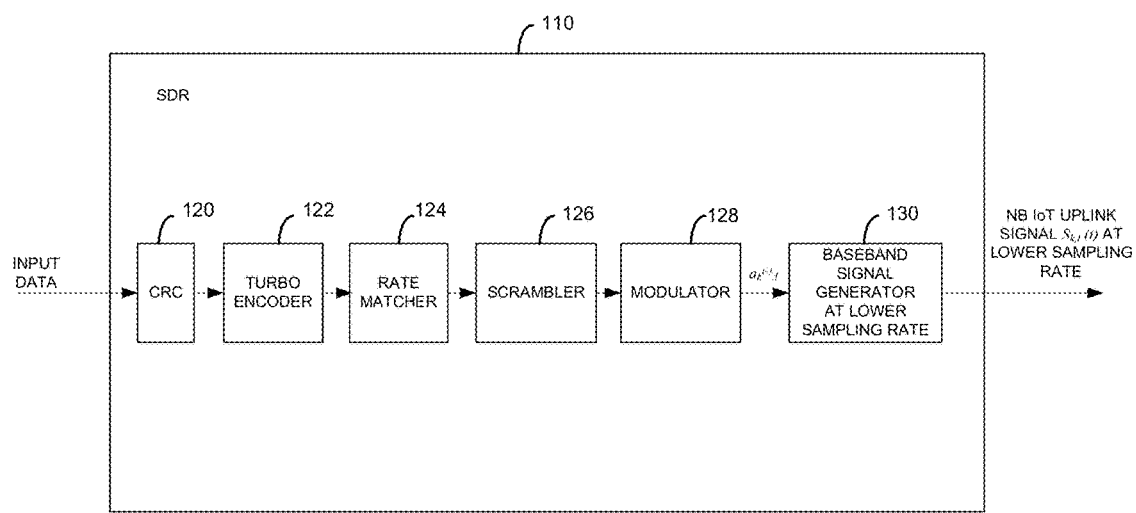
FIG. 1B is a block diagram of a software defined radio (SDR) implemented portion of narrowband IoT uplink signal generation.

FIG. 1B is a block diagram illustrating exemplary details of the portion of uplink signal processing block 106 implemented by SDR 110. Referring to FIG. 1B, SDR 110 receives input data and performs reciprocal redundancy check for the input data. SDR 110 further includes a turbo encoder 122 that encodes data bits using a turbo code to provide for error detection and correction at the receiver. A rate matcher 124 receives the bits output from turbo encoder 122, determines the set of bits to be transmitted within a transmission time interval, and performs bit interleaving for each transmit time interval. A scrambler 126 receives the bits output from rate matcher 124 and scrambles data bits with a UE-specific scrambling code known by the receiver and used to unscramble bits for each emulated UE. A modulator 128 receives the scrambled data bits output from scrambler 126 and generates the complex modulation coefficients $a_{k^{(-)},l}$ where $k^{(-)}$ is the subcarrier index from the set of values $\{0, 1, \ldots, N_{sc}^{UL}-1\}$, l is the symbol number and $N_{sc}^{UL}$ is the number of subcarriers available for uplink (UL) transmission. An under-sampled narrowband IoT uplink signal generator generates an under-sampled narrowband IoT uplink signal $s_{k,l}(t)$, where $s_{k,l}(t)$ is defined by the following equations:

$$s_{k,l}(t) = a_{k^{(-)},l} \cdot e^{j\emptyset_{k,l}} \cdot e^{j2\pi(k+1/2)\Delta f(t-N_{CP,l}T_s)} \quad (1)$$

$$\emptyset_{k,l} = \rho(\tilde{l} \bmod 2) + \varphi_k(\tilde{l}) \quad (2)$$

$$\rho = \begin{cases} \dfrac{\pi}{2} & \text{for BPSK} \\ \dfrac{\pi}{4} & \text{for QPSK} \end{cases} \quad (3)$$

$$\varphi_k(\tilde{l}) = \begin{cases} 0 & \tilde{l} = 0 \\ \varphi_k(\tilde{l}-1) + 2\pi\Delta f(k+1/2) \\ (N+N_{CP,l})T_s & \tilde{l} > 0 \end{cases} \quad (4)$$

In the equations above, Equation 1 is for $s_{k,l}(t)$, which time continuous uplink signal for sub-carrier index k, symbol l. $a_{k^{(-)},l}$ is the complex modulation value for the data bits being modulated for the resource element (k,l). The next term $e^{j\emptyset}$ defines the phase of the signal. The next term $e^{j2\pi(k+1/2)\Delta f(t-N_{CP,l}T_s)}$ defines a single tone frequency division multiplexed modulating carrier signal, which changes with each sample time t of the symbol. In Equation 1, $\Delta f$ is the subcarrier separation, $N_{CP,l}$ is the number of cyclic prefix bits in symbol l, and $T_s$ is the basic unit of time defined in 3GPP TS 36.211 as 1/(15000×2048) seconds. The number of time samples per symbol depends on the symbol number l. The term $\tilde{l}$ is a symbol counter that is reset at the start of a transmission and is incremented for each symbol during the transmission.

Equation 2 is used to calculate $\emptyset_{k,l}$, which defines the phase rotation or phase jump for the symbol. Equation 3 is used to calculate ρ, which defines a modulation based phase jump that alternates the phase of the modulation scheme to reduce the peak-to-average power ratio of the resulting UL transmit signal. For example, ρ is equal to π/2 for binary phase shift keying (BPSK) modulation and ρ is equal to π/4 for quadrature phase shift keying (QPSK). Thus, for sub-carrier 0 (k=0), symbol number 0 (l=0), assuming QPSK modulation, the phase jump $\emptyset_{k,l}$ is calculated as follows:

$$\emptyset_{k,l} = \dfrac{\pi}{4}(0 \bmod 2) + 0$$
$$= \dfrac{\pi}{4} \cdot 0$$
$$= 0$$

In Equation 4 for $\varphi_k(\tilde{l})$, the term $\varphi_k(\tilde{l}-1)$ indicates that the phase of the current symbol depends on the phase that the previous symbol, which requires phase continuity between symbols or at symbol boundaries.

Table 1 shown below from 3GPP TS 36.211 specifies the number of samples per symbol for narrowband SC-FDMA symbols.

TABLE 1

SC-FDMA Parameters for Narrowband IoT

| Parameter | $\Delta f = 3.75$ kHz | $\Delta f = 15$ kHz |
|---|---|---|
| N | 8192 | 2048 |
| Cyclic prefix length $N_{CP,l}$ | 256 | 160 for l = 0 |
| | | 144 for l = 1, 2, . . ., 6 |
| Set of values for k | −24, −23, . . ., 23 | −6, −5, . . ., 5 |

In Table 1, the parameter N defines the number of samples per symbol for different subcarrier separations $\Delta f$. Of particular interest to the subject matter described herein is the case where $\Delta f$ is 15 kHz, N is 2,048, and the cyclic prefix length is 160 for symbol 0 but 144 for symbols 1-6. This means that symbol 0 will have 2,048+160=2,208 samples and symbols 1-6 will have 2,048+144=2,192 samples that must be transmitted during each symbol time. Generating thousands of samples for each narrowband IoT device during each symbol time can increase the processing load on an IoT device emulator or a narrowband IoT device. Accordingly, baseband signal generator 130 may generate the baseband signal for a given narrowband IoT device at a lower sampling rate to reduce the number of baseband samples per IoT device. For example, if the under-sampling factor is set to 32, symbol 0 will have 2208/32=69 samples instead of 2,208 samples. Symbols 1-6 would have 2192/32=68.5 samples, which means that for some of the symbols, sample times do not occur at symbol boundaries, and, without the extrapolation processing described below, a phase discontinuity would exist at the symbol boundary. This phase discontinuity at the symbol boundary may not conform to the industry standard defined UL transmit signal for narrowband IoT devices.

Figure 2:
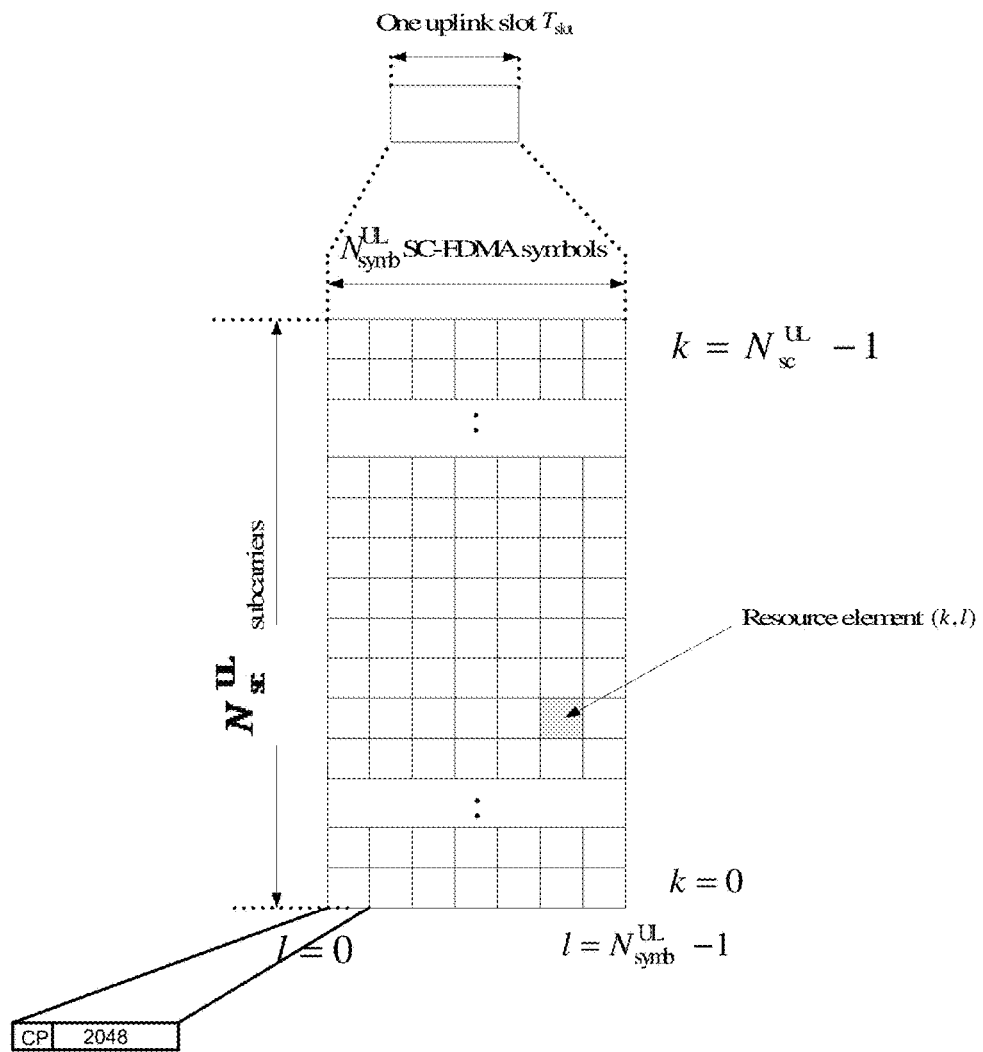
FIG. 2 is a diagram of a narrowband IoT uplink resource map.

FIG. 2 is a diagram of an uplink resource grid for narrowband IoT. In FIG. 2, each resource element (k,l) carries a narrowband IoT uplink symbol. As stated above, each symbol consists of a cyclic prefix plus 2,048 data samples, where the number of data samples in the cyclic prefix may vary depending on the symbol index l. Each row in the uplink resource grid corresponds to a subcarrier. The columns in the resource grid correspond to SC-FDMA symbols. Thus, one row in the resource grid represents a sequence of SC-FDMA symbols for a single subcarrier or a sequence of single tone SC-FDMA symbols. It is the generation of such symbols to which the subject matter described herein is directed.

The symbols are numbered 0 through 6, resulting in seven total symbols generated in one uplink timeslot. As stated above with regard to Table 1, each symbol has either 2208 or 2192 samples for the subcarrier spacing of 15 kHz. Thus, generating a fully sampled SC-FDMA symbol for the timeslot would require 2208 plus 2192 times 6 equals 15,360 samples per timeslot.

It is desirable to reduce the number of samples for more efficient uplink signal generation so that uplink signal processing block 106 in FIG. 1A can work at a lower processing rate. Such efficient generation of uplink signals is achieved by generating first baseband samples of a baseband narrowband IoT uplink signal at a lower sampling rate having an under-sampling factor of M such that uplink signal processing block 106 produces N/M samples for every N samples in an NB-IoT uplink timeslot conforming to 3GPP standard specified in Table 1. For example, one complete NB-IoT uplink time slot conforming to 3GPP standard may contain 15,360 samples of a baseband narrowband IoT uplink signal at a specified sampling rate of $30.72 \times 10^6$ samples/s. If the under-sampling factor M is set to 32, the uplink signal processing block 106 may produce 15,360/32 or 480 samples per timeslot at a lower sampling rate of $960 \times 10^3$ samples/s. NB-IoT uplink signal generation at lower sampling rate in special cases where samples do not occur at symbol boundaries will now be described.

Figures 3A, 3B:
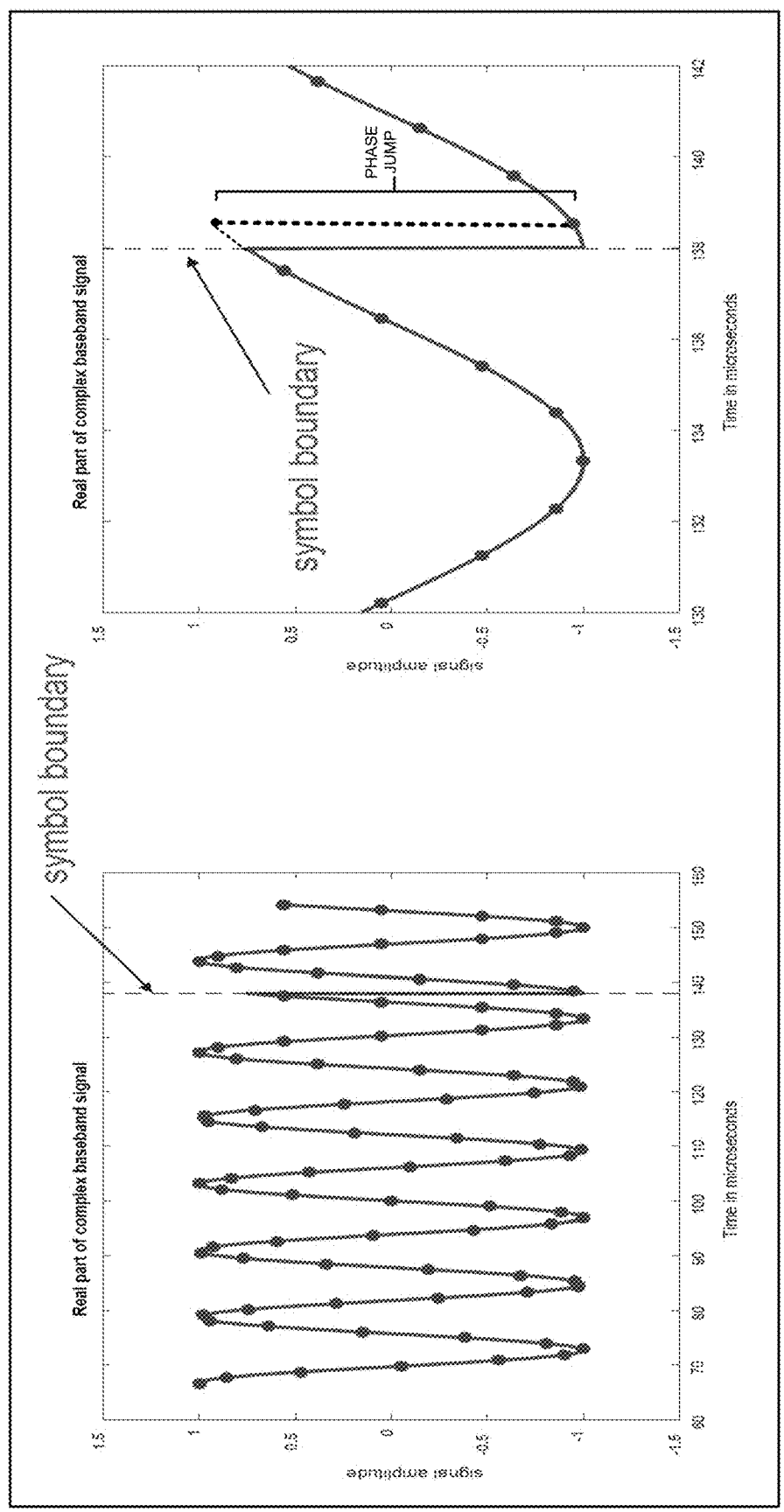
FIG. 3A is a graph illustrating under-sampling of amplitude values of amplitude values of a narrowband IoT uplink signal.
FIG. 3B is a graph illustrating a magnified view of a symbol boundary of the signal illustrated in FIG. 3A.

FIG. 3A is a graph of the real part of a complex baseband signal for symbol 1 and part of symbol 2 for the 15 kHz sub-carrier spacing in Table 1. The dots on the graph in FIG. 3A represent sample points where the SC-FDMA signal is generated at a lower sampling rate with an under-sampling factor of 32. FIG. 3B is a magnified view of the symbol boundary illustrated in FIG. 1. As illustrated in FIG. 3B, the symbol boundary occurs at 138 microseconds, but there is no sample at 138 microseconds. The last sample time in symbol 2 that is before the symbol boundary occurs at approximately 137 microseconds, and the first sample time in symbol 3 after the symbol boundary occurs at approximately 139 microseconds. Because there is no sample at the symbol boundary, a phase discontinuity exists that does not conform to the 3GPP specification set forth by Equation 1 to Equation 4 above.

Figure 4:
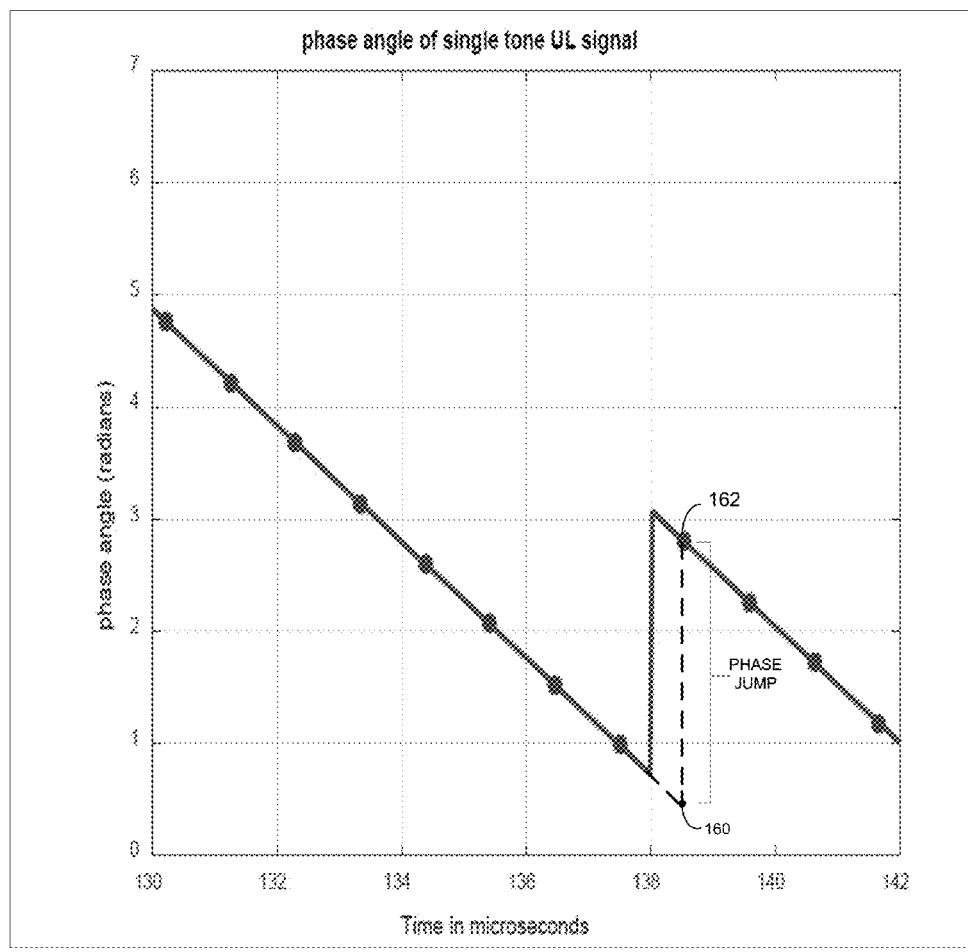
FIG. 4 is a graph illustrating under-sampling of phase values of a narrowband IoT uplink signal.

FIG. 4 illustrates the phase angle of the signal illustrated in FIGS. 3A and 3B. In FIG. 4, it can be seen that there is no sample at the symbol boundary of 138 microseconds. Accordingly, without further processing, the phase is discontinuous across the symbol boundary.

In order to eliminate the phase discontinuity, baseband signal generator 130 may extrapolate the phase of the signal from the last sample time prior to the symbol boundary to the first sample time in the first symbol after the symbol boundary. In FIG. 4, the phase value may be extrapolated from sample point 160 to sample point 162. In the illustrated example, the change in phase angle is linear, so the phase may be extrapolated linearly from the time corresponding to sample point 160 to the first sample time in symbol 3, which corresponds to sample point 162.

Once the phase is extrapolated, baseband signal generator 130 operating at a lower sampling rate may calculate the phase jump from the extrapolated phase value of the first sample point after the symbol boundary. The phase jump may be calculated using the equations set forth above. From the equations, the phase jump depends on the mapping of the data bits to a constellation point or data symbol from a complex modulation scheme and the symbol number or index. Lower sampling rate baseband signal generator 130 may calculate the phase jump or use a lookup table of pre-calculated phase jump values to determine the phase jump at the symbol boundary.

Once the phase jump is calculated, the phase jump may be added to the phase of the signal at the first sample point after the symbol boundary to produce a new phase value. The phase of the symbol may be computed continuously for the next symbol starting at the new phase value that occurred after the phase jump. In FIG. 4, the extrapolated phase value at the first sample time after the symbol boundary is approximately 0.4 radians. The calculated phase jump using Equation 2 for $\varnothing_{k,l}$ above is approximately 2.4 radians. The new phase value at the first sample point after the symbol boundary is approximately 2.4 plus 0.4 or 2.8 radians.

Extrapolating the phase and applying the phase jump also changes the amplitude of the signal across the symbol boundary. In FIG. 3B, the dotted line extending from the symbol boundary illustrates the extrapolation of the amplitude of the symbol. The vertical dotted line represents the change in amplitude that occurs at the signal as a result of applying the phase jump calculated in FIG. 4. The extrapolation of phase values and calculation of the phase jump may be performed at each symbol boundary that does not correspond to a sample point.

Figure 5:
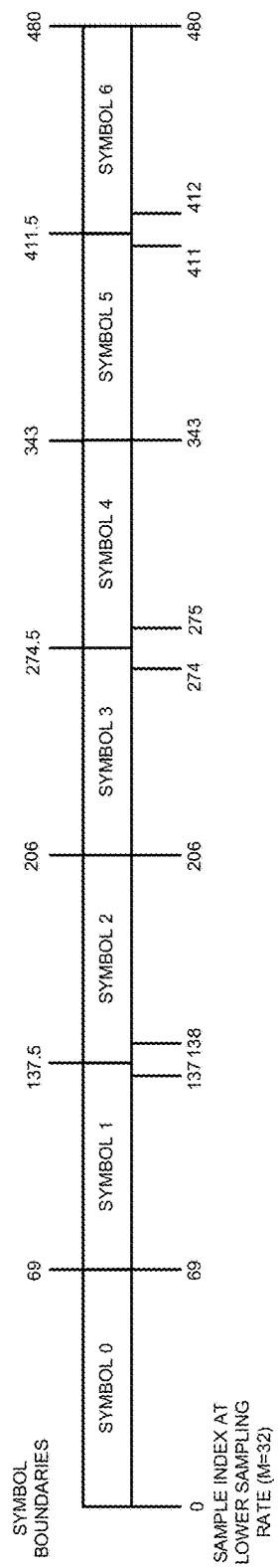
FIG. 5 is a diagram illustrating the relationship between sample times and symbol boundaries in one timeslot of a narrowband IoT uplink signal.

FIG. 5 illustrates symbols 0-6 in an SC-FDMA timeslot and sample times that do and do not correspond to signal boundaries where the sample time is 1/32 of the specified sampling rate. Referring to FIG. 5, at the boundary between symbol 0 and symbol 1, a sample time occurs at the symbol boundary. Accordingly, extrapolation of the symbol phase across the symbol boundary is not required. Between symbol 1 and symbol 2, there is no sample point at the symbol boundary. Accordingly, extrapolation is required. Narrowband IoT uplink signal generator identifies all the symbol boundaries and a time slot where sample times do not correspond to symbol boundaries and performs the extrapolation and phase jump calculations stated above.

Figure 6:
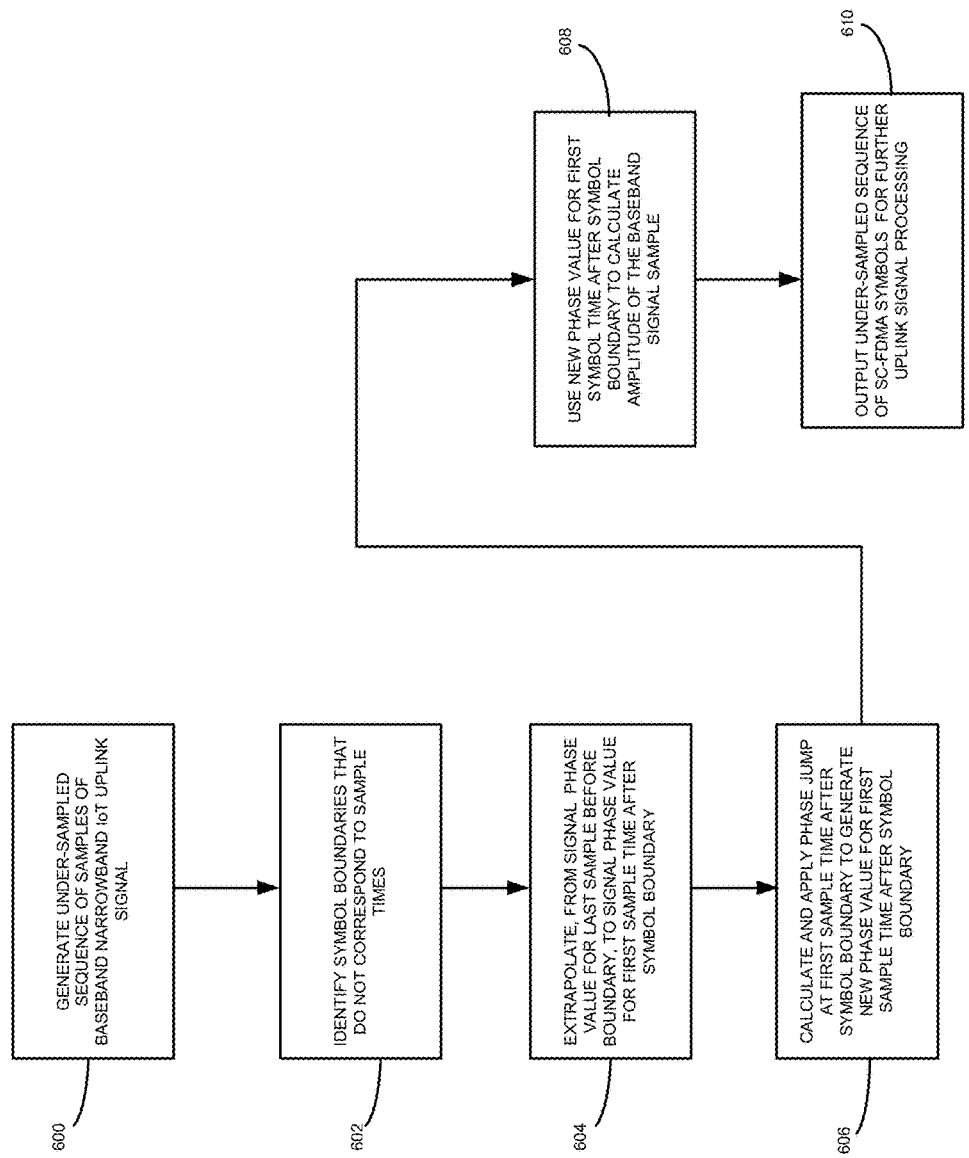
FIG. 6 flow chart illustrating exemplary process for efficiently generating narrowband IoT uplink signals.

FIG. 6 is a flow chart illustrating an exemplary process for generation of a narrowband uplink IoT signal. Referring to FIG. 6, in step 600, an under-sampled sequence of samples of a baseband narrowband IoT uplink signal is generated. For example, the sequence of samples may be sample values of a baseband narrowband IoT uplink signal for each of a plurality of SC-FDMA symbols that fill a narrowband IoT uplink time slot.

In step 602, symbol boundaries that do not correspond to sample times are identified. For example, as illustrated in FIG. 5, symbol boundaries between the first and second, third and fourth, and fifth and sixth symbols may be identified as boundaries that do not correspond to sample times.

In step 604, the process includes extrapolating, from the signal phase value for the last sample time before the symbol boundary, to the signal phase value for the first sample time after the symbol boundary, a phase value for the SC-FDMA symbol. For example, the dotted diagonal line extending across the symbol boundary in FIG. 4 may represent the extrapolation of the phase value. As the dotted diagonal line illustrates, extrapolating the phase value may include maintaining the rate of change in the phase value from the last sample time before the symbol boundary to a first sample time after the symbol boundary In step 606, the phase jump at the first sample time after the signal boundary is calculated and applied to generate a new phase value for the first sample time after the symbol boundary. In FIG. 4, the vertical dashed line represents the mount of the phase jump, which depends on the equation for $Ø_{k,l}$ above, which depends on the data value of the current symbol and the symbol number.

In step 608, the new phase value is stored for the first symbol time after the symbol value, and the phase of the signal continues from the new phase value. For example, in FIG. 4, the phase jump is calculated to yield the new phase value of approximately 2.8 radians at the first sample time after the symbol boundary. The phase is then calculated linearly for the next symbol after the symbol boundary until the next symbol boundary occurs.

In step 610, the under-sampled sequence of samples is output for further uplink signal processing. For example, returning to FIG. 1, the under-sampled sequence of samples output from uplink signal processing block 106 may be output to uplink signal processing block 108 for processing, such as interpolation, followed by frequency shifting and digital-to-analog conversion. Uplink signal processing block interpolates the samples to generate the set of interpolated uplink signal samples. For example, the interpolator may receive as input the set of 480 samples for the single carrier in an uplink SC-FDMA timeslot. The interpolator may generate a full set of 15,360 samples for the timeslot by interpolating the sample values between the under-sampled values. The interpolated uplink SC-FDMA symbol samples, after frequency shifting and digital-to-analog conversion, will be transmitted to the device under test.

Figure 7:
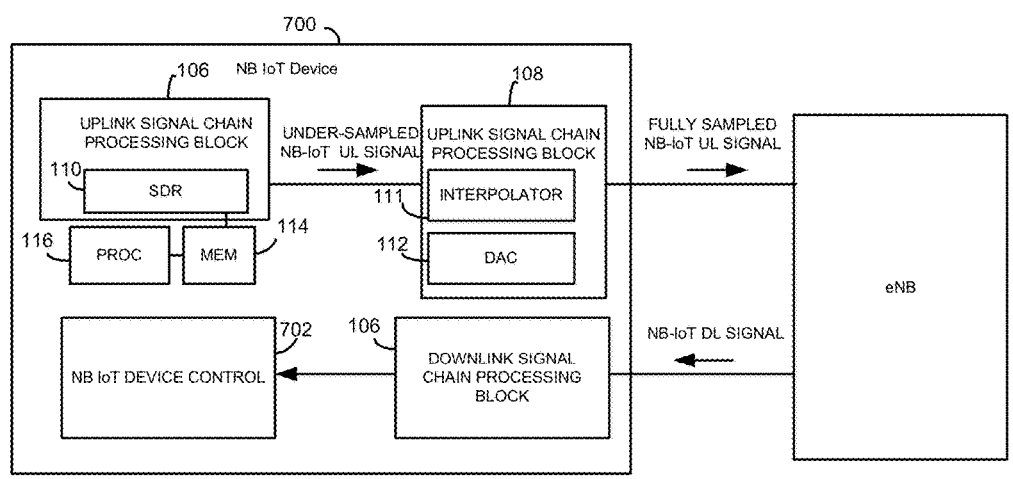
FIG. 7 is a block diagram illustrating a narrowband IoT device that efficiently generates narrowband IoT uplink signals.

In FIG. 1, generation of under-sampled uplink signals is performed by a multi-UE emulator. However, the subject matter described herein is not limited to multi-UE emulator. The subject matter described herein may also be implemented in a narrowband IoT device as illustrated in FIG. 7. Referring to FIG. 7, a narrowband IoT device 700 includes uplink signal processing block 106, uplink signal processing block 108, and downlink signal processing block 118 illustrated in FIG. 1. Narrowband IoT device 700 may be any suitable IoT device that utilizes narrowband uplink communications. In one example, narrowband IoT device 700 may be a sensor. Narrowband IoT device 700 also includes a narrowband IoT device control module 702 that controls the operation of narrowband IoT device 700. Similar to the operation of multi-UE emulator 100 illustrated in FIG. 1, uplink signal processing block 106 generates the under-sampled narrowband IoT uplink signals and outputs the under-sampled signal to uplink signal processing block 108. Uplink signal processing block 108 interpolates and converts the signal to an analog signal for transmission to eNB 704. Because narrowband IoT device 700 can generate an under-sampled signal, less processing is required than devices that generate and process the fully sampled narrowband IoT signals.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for efficient generation of a narrowband Internet of things (IoT) uplink signal, the method comprising:

at a first uplink signal processing block implemented by at least one processor:
generating an under-sampled sequence of samples of a baseband narrowband IoT uplink signal;
identifying symbol boundaries in the sequence of samples that do not correspond to sample times;
for each symbol boundary that does not correspond to one of the sample times:
extrapolating, from a signal phase value for a sample at a last sample time before the symbol boundary, a signal phase value for a sample at a first sample time after the symbol boundary;
calculating and applying a phase jump to the sample at the first sample time after the symbol boundary to generate a new phase value for the sample at the first sample time after the symbol boundary, wherein the phase jump is applied from the phase value extrapolated from the last sample time before the symbol boundary; and using the new phase value for the first sample time after the symbol boundary to calculate amplitude of the sample at the first sample time after the symbol boundary; and outputting the under-sampled sequence of samples for further uplink signal processing.

2. The method of claim 1 wherein generating the under-sampled sequence of samples includes generating the sequence samples at a sampling rate of N/M, where N is number of samples specified by an industry standard and M is an under-sampling factor.

3. The method of claim 2 where N is equal to a number of cyclic prefix samples plus a number of data samples per symbol.

4. The method of claim 1 wherein extrapolating the phase value includes maintaining a rate of change in the phase value from the last sample time before the symbol boundary to a first sample time after the symbol boundary.

5. The method of claim 1 wherein calculating the phase jump includes calculating the phase jump based on a symbol index and a data value of a symbol after the symbol boundary.

6. The method of claim 1 wherein outputting the under-sampled sequence of samples for further uplink signal processing includes outputting the sequence of samples to a second uplink signal processing block for interpolation, frequency shifting, and digital-to-analog conversion.

7. The method of claim 6 wherein the first and second uplink signal processing blocks are per-UE uplink signal processing blocks in a multi-UE emulator that emulates multiple narrowband IoT devices.

8. The method of claim 7 wherein the first uplink signal processing block implements a software defined radio.

9. The method of claim 6 wherein the first and second uplink signal processing blocks are uplink signal processing blocks in a narrowband IoT device.

10. A system for efficient generation of a narrowband Internet of things (IoT) uplink signal, the system comprising:

at least one processor and a memory;

a first uplink signal processing block implemented by at least one processor and configured to:

generate an under-sampled sequence of samples of a baseband narrowband IoT uplink signal;

identify symbol boundaries in the sequence of samples that do not correspond to sample times;

for each symbol boundary that does not correspond to one of the sample times:

extrapolate, from a signal phase value for a sample at a last sample time before the symbol boundary, a signal phase value for a sample at a first sample time after the symbol boundary;

calculate and apply a phase jump to the sample at the first sample time after the symbol boundary to generate a new phase value for the sample at the first sample time after the symbol boundary, wherein the phase jump is applied from the phase value extrapolated from the last sample time before the symbol boundary; and using the new phase value for the first sample time after the symbol boundary to calculate amplitude of the sample at the first sample time after the symbol boundary; and output the under-sampled sequence of samples for further uplink signal processing.

11. The system of claim 10 wherein generating the under-sampled sequence of samples includes generating the sequence of samples at a sampling rate of N/M, wherein N is the number of samples specified by an industry standard and M is an under-sampling factor.

12. The system of claim 11 where N is equal to a number of cyclic prefix samples plus a number of symbol samples for each of the SC-FDMA symbols.

13. The system of claim 10 wherein extrapolating the phase value includes maintaining a rate of change in the phase value from the last sample time before the symbol boundary to the first sample time after the symbol boundary.

14. The system of claim 10 wherein calculating the phase jump includes calculating the phase jump based on a symbol index and a data value of a symbol after the symbol boundary.

15. The system of claim 10 wherein outputting under-sampled sequence of samples for further uplink signal processing includes outputting the under-sampled sequence of samples to a second uplink signal processing block for interpolation, frequency shifting, and digital-to-analog conversion.

16. The system of claim 15 wherein the first and second uplink signal processing blocks are per-UE uplink signal processing blocks in a multi-UE emulator that emulates multiple narrowband IoT devices.

17. The system of claim 16 wherein the first uplink signal processing block implements a software defined radio.

18. The system of claim 15 wherein the first and second uplink signal processing blocks are uplink signal processing blocks in a narrowband IoT device.

19. The system of claim 18 wherein the narrowband IoT device comprises a sensor.

20. A non-transitory computer readable medium having stored thereon executable instructions that when executed by the processor of a computer controls the computer to perform steps comprising:

at a first uplink signal processing block implemented by at least one processor:

generating an under-sampled sequence of samples of a baseband narrowband IoT uplink signal;

identifying symbol boundaries in the sequence of samples that do not correspond to sample times;

for each symbol boundary that does not correspond to one of the sample times:

extrapolating, from a signal phase value for a sample at a last sample time before the symbol boundary, a signal phase value for a sample at a first sample time after the symbol boundary;

calculating and applying a phase jump to the sample at the first sample time after the symbol boundary to generate a new phase value for the sample at the first sample time after the symbol boundary, wherein the phase jump is applied from the phase value extrapolated from the last sample time before the symbol boundary; and using the new phase value for the first sample time after the symbol boundary to calculate amplitude of the sample at the first sample time after the symbol boundary; and outputting the under-sampled sequence of samples for further uplink signal processing.

* * * * *